United States Patent [19]

Fukutomi et al.

[11] Patent Number: 4,776,630
[45] Date of Patent: Oct. 11, 1988

[54] ROOF STRUCTURE FOR A CONVERTIBLE VEHICLE BODY

[75] Inventors: Hisao Fukutomi; Takanori Tuchiya; Takeshi Yamamoto; Takeshi Konishi; Iseo Hamasaki; Yutaka Imura, all of Hiroshima, Japan

[73] Assignee: Mazda Motor Corporation, Hiroshima, Japan

[21] Appl. No.: 932,932

[22] Filed: Nov. 20, 1986

[30] Foreign Application Priority Data

| Nov. 20, 1985 | [JP] | Japan | 60-260832 |
| Nov. 20, 1985 | [JP] | Japan | 60-260837 |
| Nov. 20, 1985 | [JP] | Japan | 60-260838 |
| Nov. 20, 1985 | [JP] | Japan | 60-178845 |

[51] Int. Cl.$^4$ .............................................. B60J 7/10
[52] U.S. Cl. ................................. 296/107; 296/117
[58] Field of Search ............... 296/107, 108, 117, 112, 296/115, 146, 186, 116, 65 R

[56] References Cited

U.S. PATENT DOCUMENTS

| 2,157,783 | 5/1939 | Bessonneau | 296/116 |
| 2,596,355 | 5/1952 | Ackermans | 296/107 |
| 2,696,403 | 12/1954 | Baugh | 296/65 R X |
| 2,768,024 | 10/1956 | Spear, Jr. | 296/107 |
| 2,812,975 | 11/1957 | Warner | 296/117 |
| 2,939,742 | 6/1960 | Dardarian et al. | 296/107 |
| 4,557,502 | 12/1985 | Scaduto et al. | 280/756 |
| 4,626,020 | 12/1986 | Kaltz et al. | 296/107 |

FOREIGN PATENT DOCUMENTS

| 59-48230 | 3/1984 | Japan . |
| 59-133375 | 9/1984 | Japan . |
| 2086316 | 5/1982 | United Kingdom . |

Primary Examiner—Dennis H. Pedder
Attorney, Agent, or Firm—Fleit, Jacobson, Cohn & Price

[57] ABSTRACT

A convertible vehicle body structure having a rigid front roof panel covering the front top portion of the passenger compartment and a rear roof panel covering the rear portion of the passenger compartment. The front roof panel is supported by an inverted U-shaped swingable pillar and the rear roof panel is mounted on the rear body structure through mounting arms. The front and rear roof panels are retracted in the rear body section in a fore-and-aft jaxtaposed relationship.

21 Claims, 19 Drawing Sheets

ROOF STRUCTURE FOR A CONVERTIBLE VEHICLE BODY

BACKGROUND OF THE INVENTION

1. Field of the Invention

The present invention relates to a roof structure of a vehicle body, and more particularly to a roof structure for a convertible type vehicle body.

2. Description of the Prior Art

The British Pat. No. 2,086,316 discloses a convertible type vehicle structure having an inverted U-shaped swingable pillar which is swingable between an erected position and a retracted position. In the erected position of the swingable pillar, a rigid roof panel is removably attached to extend between the front header of the front windshield and the swingable pillar. A foldable hood is provided between the swingable pillar and the rear body structure to cover the rear portion of the vehicle body. For opening the vehicle body top, the rigid roof panel is at first removed and the swingable pillar is then swung rearwardly simultaneously folding the hood.

The convertible vehicle body structure as proposed by the British patent is however inconvenient to handle because the rigid roof panel must at first be removed and stored in a suitable place such as the trunk room, and thereafter the swingable pillar must be moved to the retracted position. It should further be noted that the hood covering the rear body portion does not have an attractive appearance and flutters during high speed operation under wind pressure producing uncomfortable noises.

SUMMARY OF THE INVENTION

It is an object of the present invention to provide a convertible type vehicle body structure having an attractive appearance and which is convenient to handle.

Another object of the present invention is to provide a convertible type vehicle body structure in which the roof panel can be retracted together with the swingable pillar.

A further object of the present invention is to provide a convertible type vehicle body structure having rigid roof panels covering the top portion as well as the rear portion and being able to be retracted simultaneously with the swingable pillar.

Still a further object of the present invention is to provide a roof structure for a convertible type vehicle body structure which has a swingable pillar structure movable between an erected position and a retracted position and a rigid rear roof panel covering the rear roof portion between the erected pillar structure and the rear body section.

Yet a further object of the present invention is to provide a convertible vehicle body structure having a swingable pillar structure, a rigid front roof panel covering the body top between the front windshield and the pillar structure and a rigid rear roof panel covering the body rear portion between the pillar structure and the rear body section, the roof panels being retractable in a fore-and aft relation with each other.

According to the present invention, the above and other objects can be accomplished by a convertible vehicle body structure including body means having front windshield means provided at an upper portion with front header means and a rear body section, swingable pillar means having a pair of leg means swingably mounted on said rear body section for swinging movements between an erected position wherein the leg means are erected in substantially upright positions and a retracted position wherein the leg means are retracted in the rear body section, substantially rigid front roof panel means for covering a portion between said front header means and said pillar means in the erected position, substantially rigid rear roof panel means for covering a portion between said pillar means in the erected position and said rearbody section, said front roof panel means being attached to said pillar means so that the front roof panel means is retracted into said rear body section when the pillar means is moved to the retracted position, said rear roof panel means being attached to said rear body section so that the rear roof panel means is retracted into the rear body section, said rear roof panel means being located in a fore-and-aft relationship with respect to the front roof panel means when both the front and rear roof panel means are retracted.

According to a further feature of the present invention, means is provided for moving the front and rear roof panel means in a predetermined relationship with each other.

The above and other objects and features of the present invention will become apparent from the folllowing descriptions of preferred embodiments taking reference to the accompanying drawings.

DESCRIPTION OF THE PREFERRED EMBODIMENTS

Figure 1:
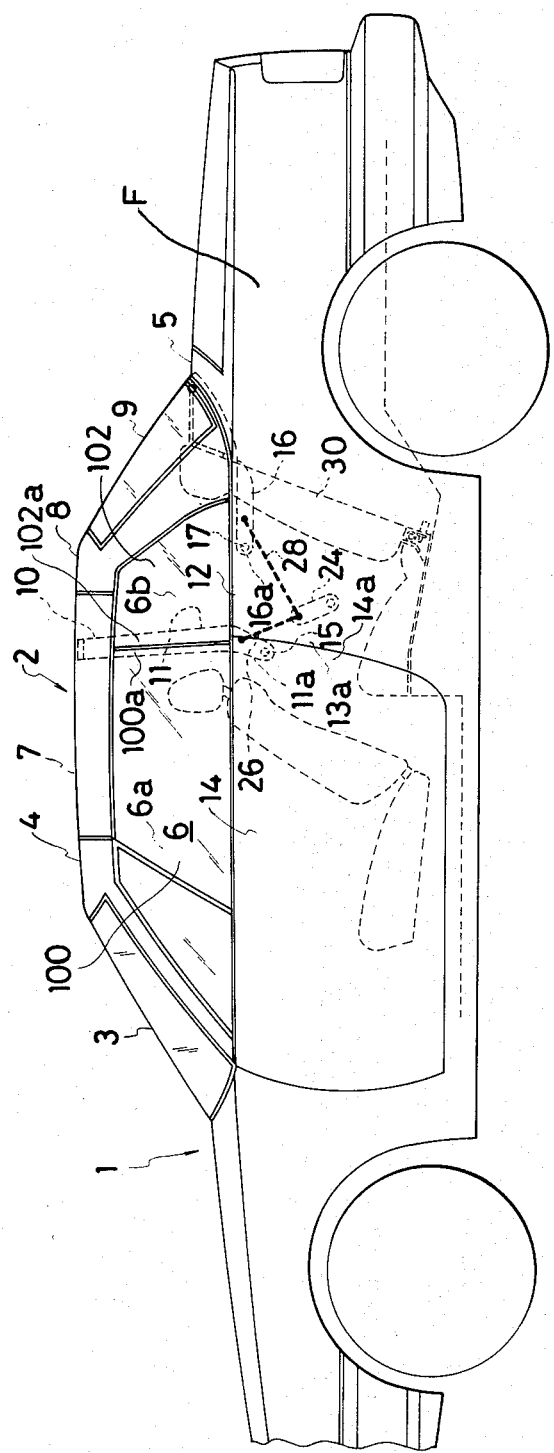
FIG. 1 is a side view of a convertible type vehicle in accordance with one embodiment of the present invention.
Figure 6:
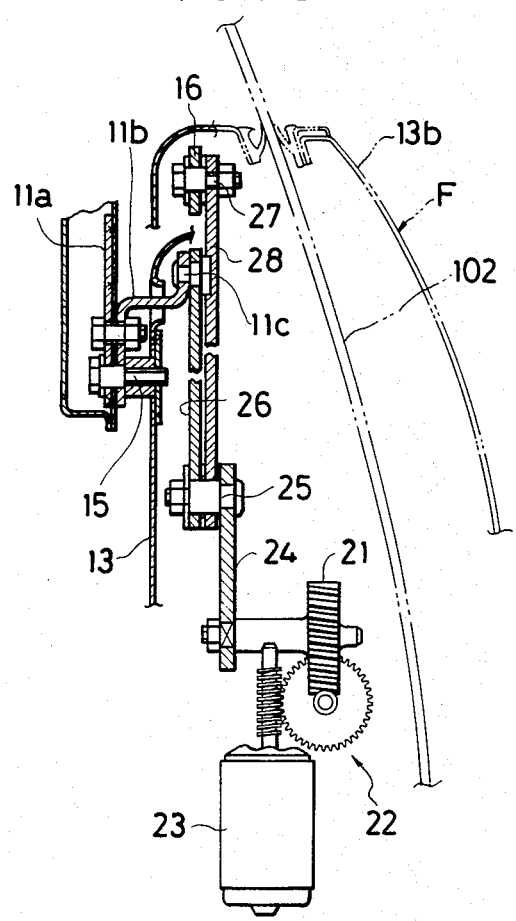
FIG. 6 is a sectional view taken along the line B—B in FIG. 5.
Figure 7:
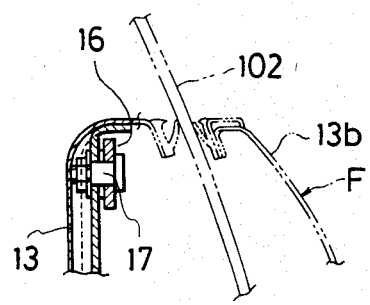
FIG. 7 is a sectional view taken along the line A—A in FIG. 5.
Figure 11:
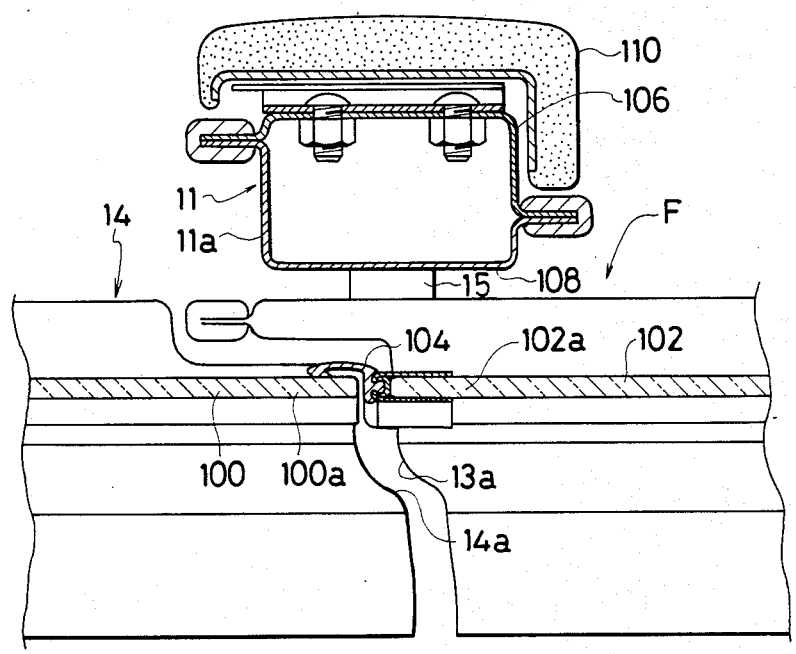
FIG. 11 is a sectional view taken along the line XI—XI in FIG. 9.

Referring to the drawings, particularly to FIG. 1, there is shown a convertible type vehicle body 1 including a front windshield 3 having an upper edge portion or front header 4. The vehicle body 1 further includes a rear body section 5 which has a pair of rear fender panel assemblies F having an upper edge 12 defining a vehicle belt line. As shown in FIGS. 6 and 7, the rear fender panel assembly F is constituted by an inner panel 13 and an outer panel 13b. Referring to FIG. 11, it will be noted that the rear fender panel assembly F has a front edge portion 13a of a stepped configuration which defines a rear edge of a side door opening. In the side door opening, there is provided a side door 14 having a rear edge portion 14a of a cross-section which is complimentary to the cross-section of the front edge portion 13a of the rear fender panel F. There is provided a roof structure 2 which includes a front roof section 7 and a rear roof section 8 having a transparent rear windshield glass 9.

Figure 2:
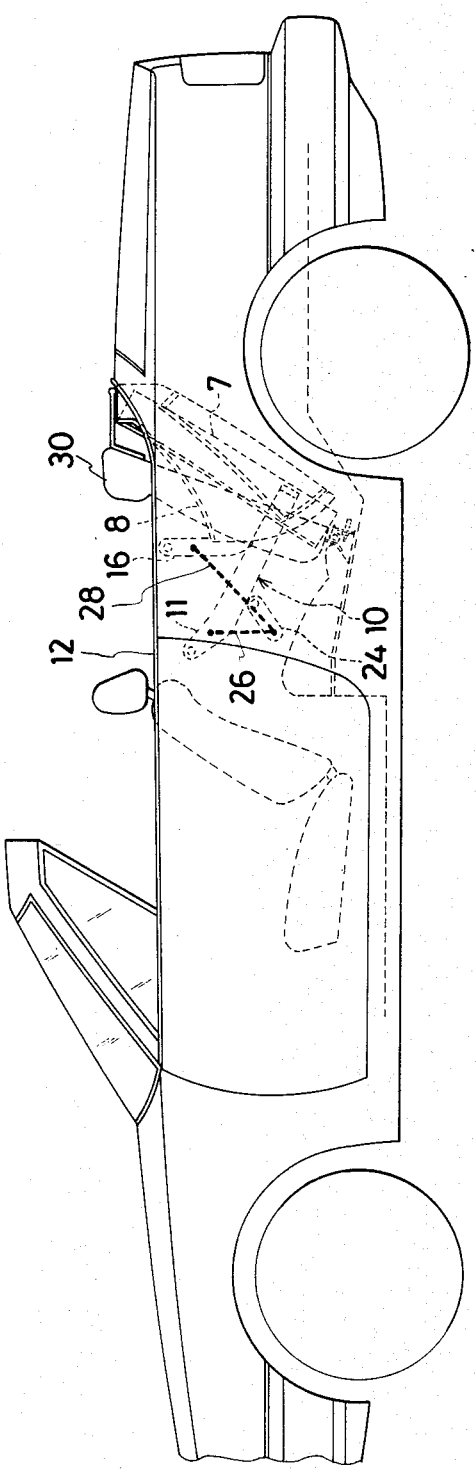
FIG. 2 is a side view of the vehicle shown in FIG. 1 but shown in an open-top condition.

The front roof section 7 is separated from the rear roof section 8 and supported by a swingable pillar structure 10 of a substantially inverted U-shaped configuration. The pillar structure 10 has a pair of leg portions 11 extending downward from the intermediate portion which is secured to the front roof portion 7. The leg portion 11 has a lower end 11a which is slightly forwardly bent and pivotably attached to the front edge portion 13a of the rear fender panel assembly F by means of a shaft 15 as shown in FIG. 11. It will be noted that the pillar structure 10 may not necessarily be of an inverted U-shaped configuration but it may be substituted by a pair of supporting legs. The pillar structure 10 is swingable between an upright position as shown in FIG. 1 and a retracted position as shown in FIG. 2. In the upright position, the pillar structure 10 stands substantially upright and supports the front roof panel 7 in a position wherein the roof panel 7 covers a front part 6a of a passanger compartment 6. In the retracted position, the pillar structure 10 is retracted into the rear body section until the front roof panel 7 is housed in the rear body section.

Figure 3:
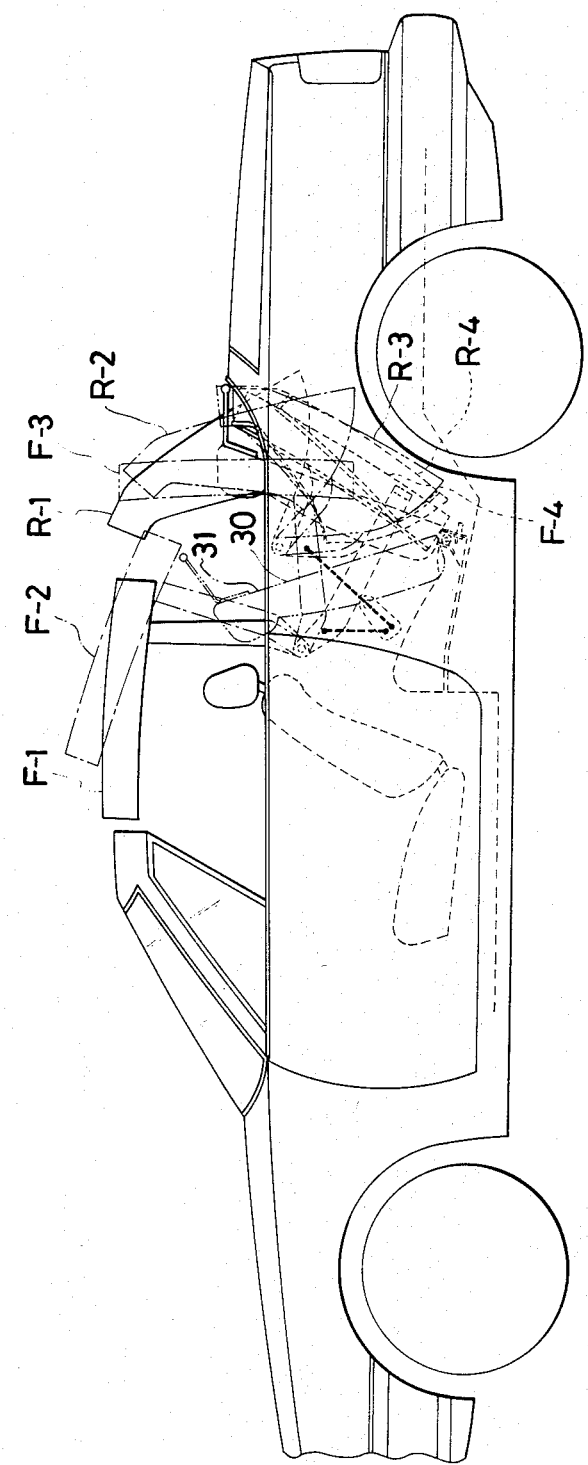
FIG. 3 is a side view showing the movements between the open and closed conditions.

As shown in FIG. 1, the rear roof panel 8 is provided at a lower portion of each side with a forwardly extending attachment arm 16 having a forward end portion 16a pivotably attached to the inner panel 13 of the rear fender panel assembly F by means of a pivot pin 17. The rear roof panel 8 is therefore swingable about the pivot pin 17 between an erected position as shown in FIG. 1 and a retracted position as shown in FIG. 2. In the erected position, the rear roof panel 8 covers a rear portion 6b of the passanger compartment 6 and provides a continuous roof structure together with the front roof panel 7. In the retracted position, the rear roof panel 8 is retracted in the rear body section. It will be noted that in the retracted positions, the front roof panel 7 and the rear roof panel 8 are juxtaposed in a fore-and-aft relationship with each other in the rear body section so that the passanger compartment 6 is completely opened. FIG. 3 shows sequential steps for moving the roof panels 7 and 8 from the erected positions to the retracted positions.

Figure 5:
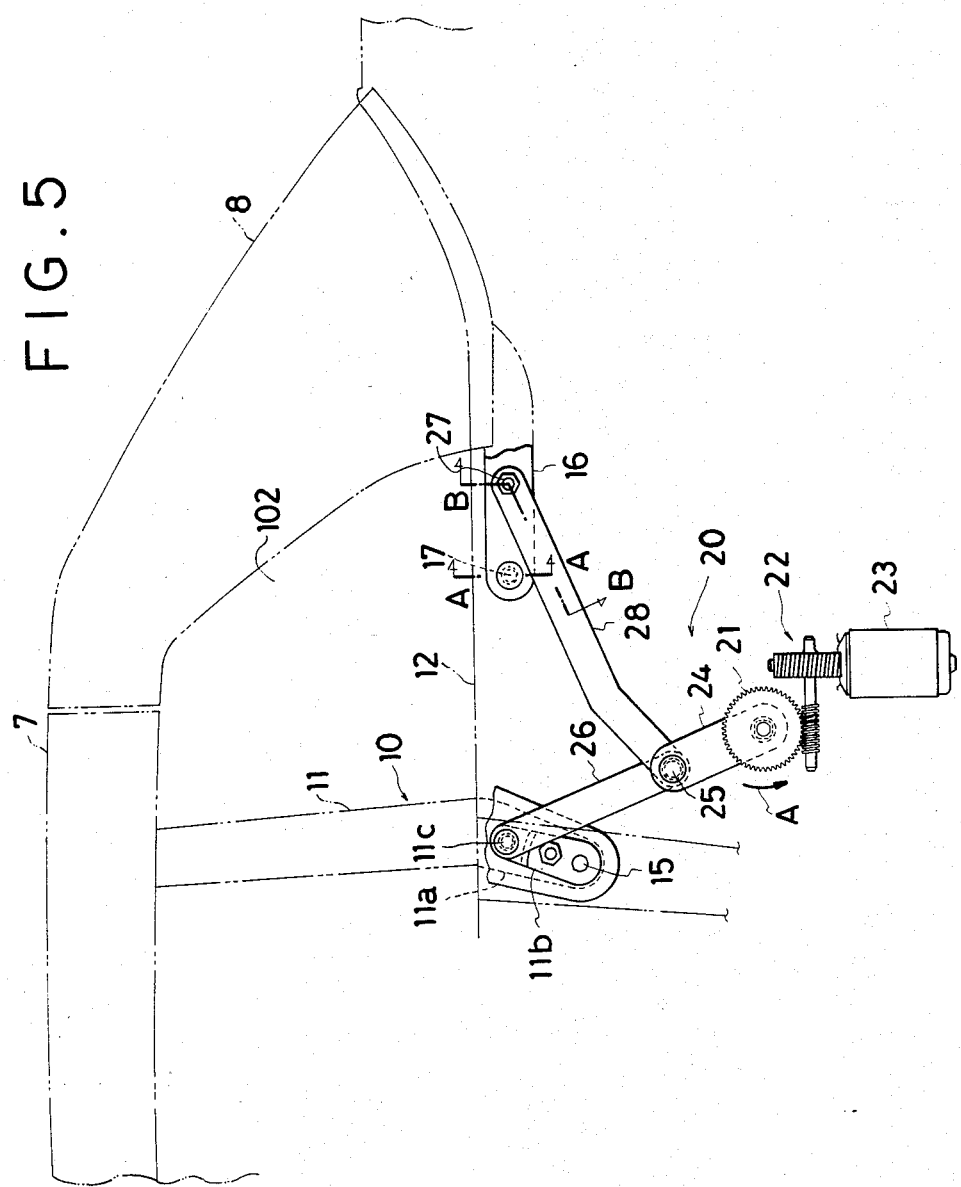
FIG. 5 is a side view showing essential parts of the roof actuating mechanism.

Referring to FIG. 5, there is shown a driving mechanism 20 for driving the roof panels 7 and 8 between the erected positions and the retracted positions. The driving mechanism 20 includes a driving gear 21 which is mounted on the rear fender panel assembly F and driven by an electric motor 23 through a worm gear device 22. The driving gear 21 is provided with a driving link arm 24 which is secured to the gear 21 at one end. The other end of the link arm 24 is pivotably connected through a pivot pin 25 with a first link 26 and a second link 28.

An arm 11b is secured at one end to the lower end portion 11a of the legs 11 of the pillar structure 10. The other end of the arm 11b is pivotably connected through a pivot pin 11c with a free end of the link arm 26. The link arm 28 is pivotably connected at the free end with the arm 16 on the rear roof panel 8 through a pivot pin 27 at a position rearward the pivot pin 17. As shown in FIG. 6, the driving mechanism 20 is located between the inner panel 13 and the outer panel 13b of the rear fender panel assembly F and mounted on the inner panel 13. The arm 11b which is attached to the leg 11 of the pillar structure 10 extends through a slot formed in the inner panel 13.

Figure 4:
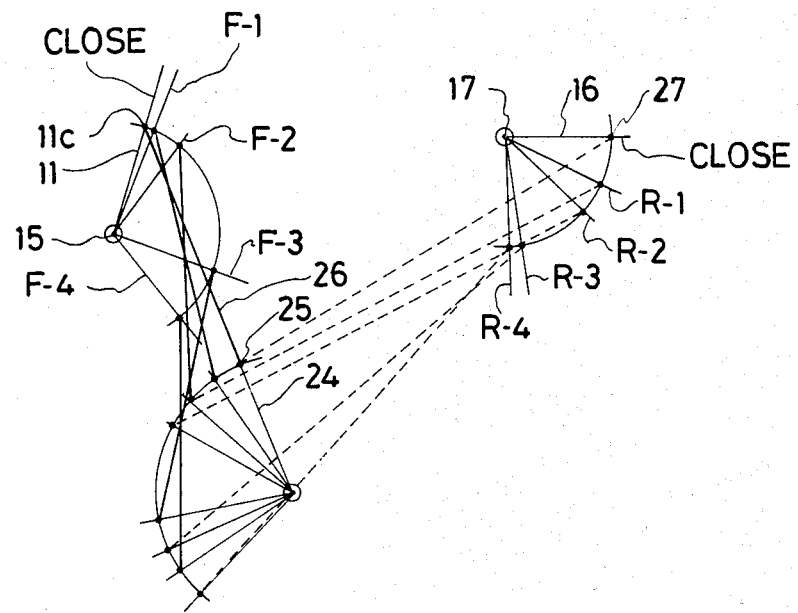
FIG. 4 is a side view showing the operation of the link mechanism.

In the erected position of the front roof panel 7, the link arms 24 and 26 align in a line as shown in FIG. 5 so that the pillar structure 10 is forced to the erected position. In the erected position of the rear roof panel 8, the link arm 28 extends substantially perpendicularly to the link arm 24. The link arm further extends so that it makes a small angle with the arm 16. For retracting the roof panels, the motor 23 is actuated to rotate the link arm 24 in the direction as shown by an arrow A. Due to the geometrical arrangement, the swingable movement of the pillar structure 10 is relatively small in the initial stage of the rotation of the link arm 24. The link arm 28 is however moved relatively rapidly so that the rear roof panel is started to be retracted more rapidly than the front roof panel 7. The positions of the roof panels 7 and 8 in the initial stage of the retracting movements are shown by F-1 and R-1 in FIG. 3. Thereafter, the roof panels 7 and 8 are moved to positions F-2 and R-2 and to positions F-3 and R-3. The completely retracted positions are shown by F-4 and R-4. FIG. 4 shows the operations of the link arms.

Figure 8:
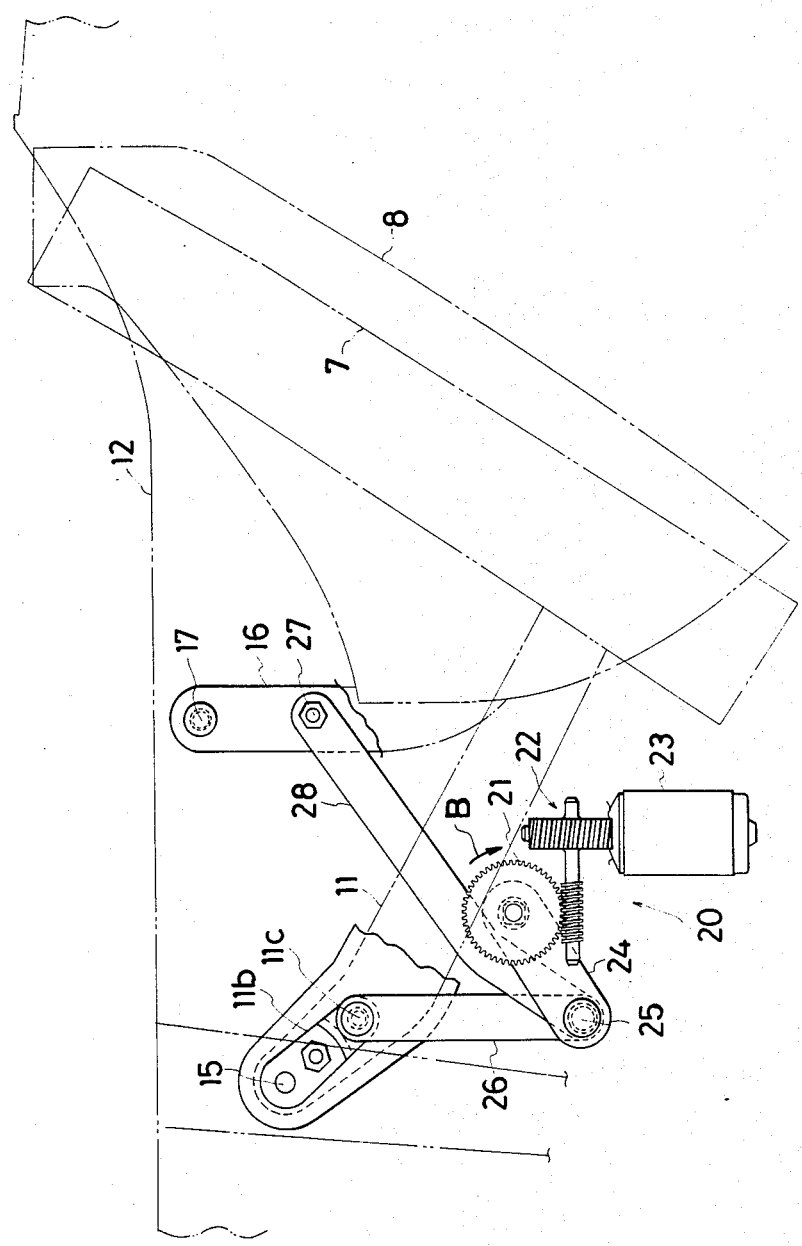
FIG. 8 is a fragmentary illustration of the roof actuating mechanism.
Figure 9:
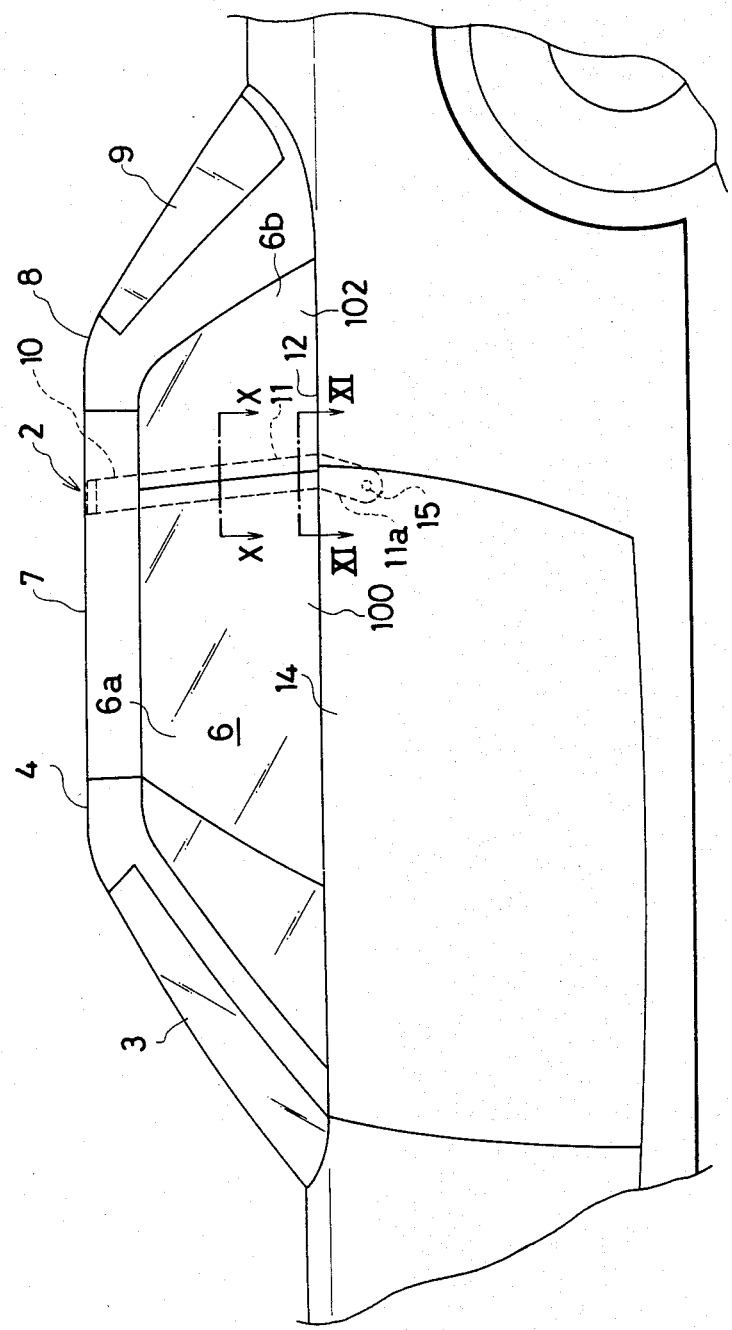
FIG. 9 is a fragmentary side view of the vehicle shown in FIG. 1.

In the retracted position, the link arm 26 makes a relatively large angle with the driving arm 24 whereas the link arm 28 makes a small angle with the driving arm 24 as shown in FIG. 8. It will therefore be understood that when the arm 24 is rotated in the direction shown by an arrow B in FIG. 8 to move the roof panels to the extended positions, the arm 28 is moved relatively slowly in the initial stage of the movement as compared with the link arm 26. Therefore, the front roof panel 7 is moved faster than the rear roof panel 8. In case where rear passenger seats 30 are provided as in the illustrated embodiment, it would be preferable to fold the seat backs 31 forwardly as shown in FIG. 3, when the roof panels 7 and 8 are being actuated.

Figure 10:
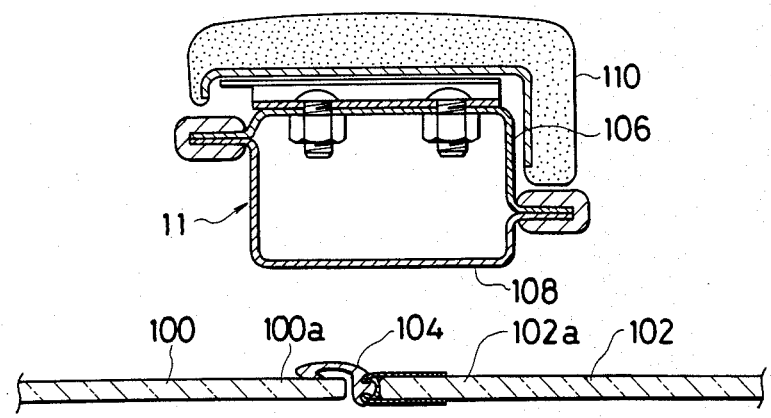
FIG. 10 is a sectional view taken along the line X—X in FIG. 9.

It will be noted that as shown in FIGS. 1, 6 and 7, a rear quarter glass panel 102 is provided in the rear fender panel assembly F. The rear quarter glass panel 102 is movable between the extended position as shown in FIG. 1 and a retracted position wherein it is completely retracted into the rear fender panel assembly F. The side door assembly 14 further has a door glass 100 which is also retractable into the door panel. Suitable glass actuating mechanisms may be provided in the rear fender panel assembly F and the side door assembly 14. Referring now to FIGS. 10 and 11, it will be noted that the door glass 100 has a rear edge portion 100a which located transversely outside the pillar structure 10 in the erected position. The rear quarter glass panel 102 has a front edge portion 102a which is also located outside the pillar structure 10 and extends along the rear edge portion 100a of the door glass 100. The rear quarter glass panel 102 is flush with the door glass 100 at the front edge portion 102a and the front edge portion 102a is in an abutting relationship with the rear edge portion 100a of the door glass 100 with a small gap therebetween. A weather strip 104 is provided along the front edge portion 102a of the rear quarter glass panel 102. The weather strip 104 is brought into contact with the rear edge portion 100a of the door glass 100 to provide a weathertight seal between the glasses 100 and 102 when the roof panels 7 and 8 are erected.

In FIGS. 10 and 11, it will further be noted that the pillar structure 10 is constituted by an inner panel 106 and an outer panel 108 which are connected together at the front and rear edges to form a structure of a closed cross-section. An inner trim panel 110 is attached to the inner panel 106.

Figure 12:
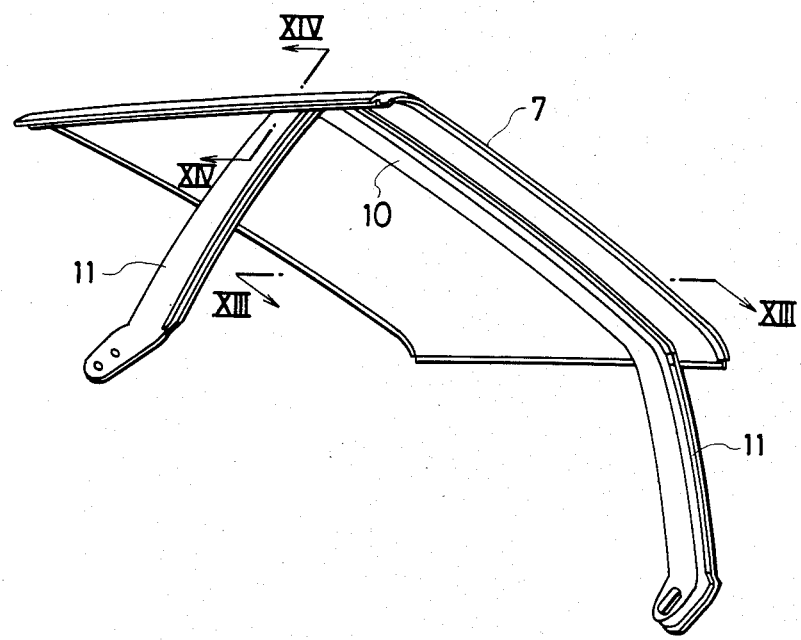
FIG. 12 is a perspective view showing the details of the roof panel.
Figure 13:
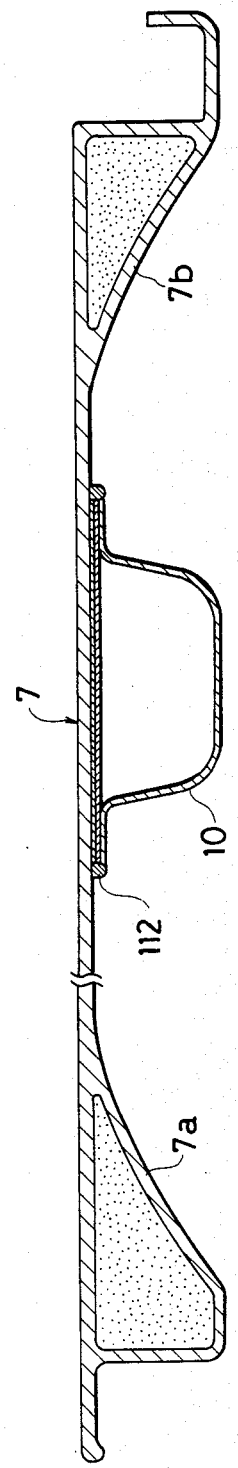
FIG. 13 is a sectional view taken along the line XIII—XIII in FIG. 12.
Figure 14:
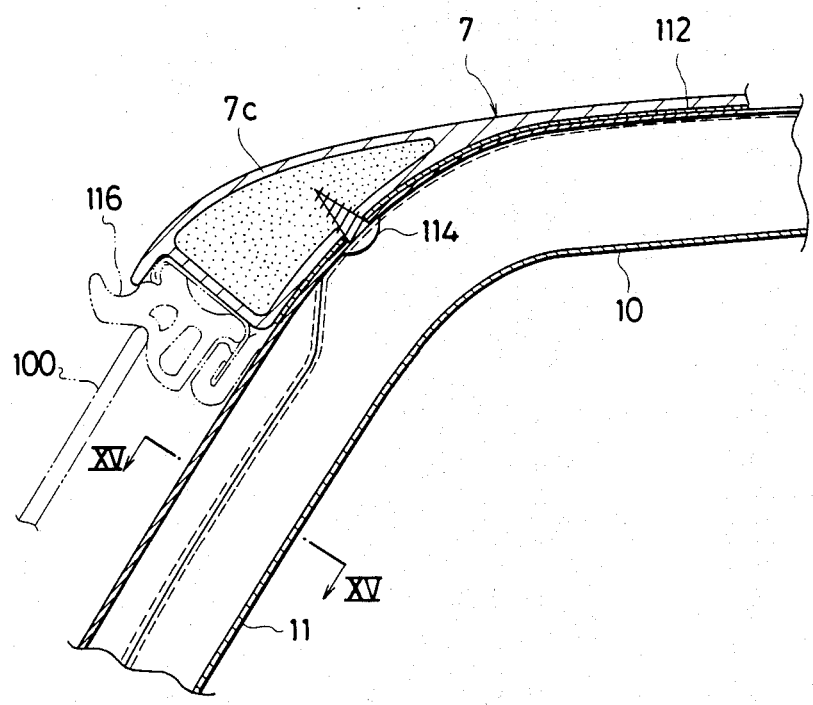
FIG. 14 is a sectional view taken along the line XIV—XIV in FIG. 12.
Figure 15:
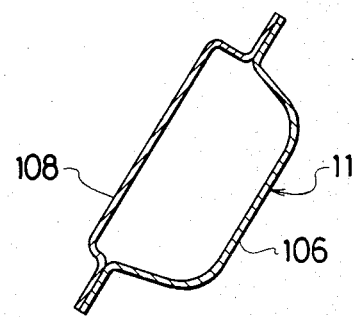
FIG. 15 is a sectional view taken along the line XV—XV in FIG. 14.

Referring to FIGS. 12 and 13, it will be noted that the pillar structure 10 is secured to the front roof panel 7 at the intermediate part. An adhesive 112 may be used to attach the pillar structure 10 to the roof panel 7. At the front and rear edge portions, the front roof panel 7 is formed with reinforcements 7a and 7b to provide increased rigidity. Referring to FIG. 14, it will be noted that the roof panel 7 is formed at the opposite sides with side reinforcements 7c where the pillar structure 10 is secured to the roof panel 7 by means of screws 114. A weather strip 116 is attached to each side edge of the front roof panel 7 to provide a weather-tight seal between the glasses 100 and 102 and the roof panel 7. Although not shown in the drawings, a similar weather strip is provided on the rear edge of the front header 4 for weather-tight contact with the front edge of the front roof panel 7. The rear roof panel is also provided at the front and side edges with weather strips for engagement with the rear edge of the front roof panel 7 and the upper and rear edges of the rear quarter panel 102.

Figure 16:
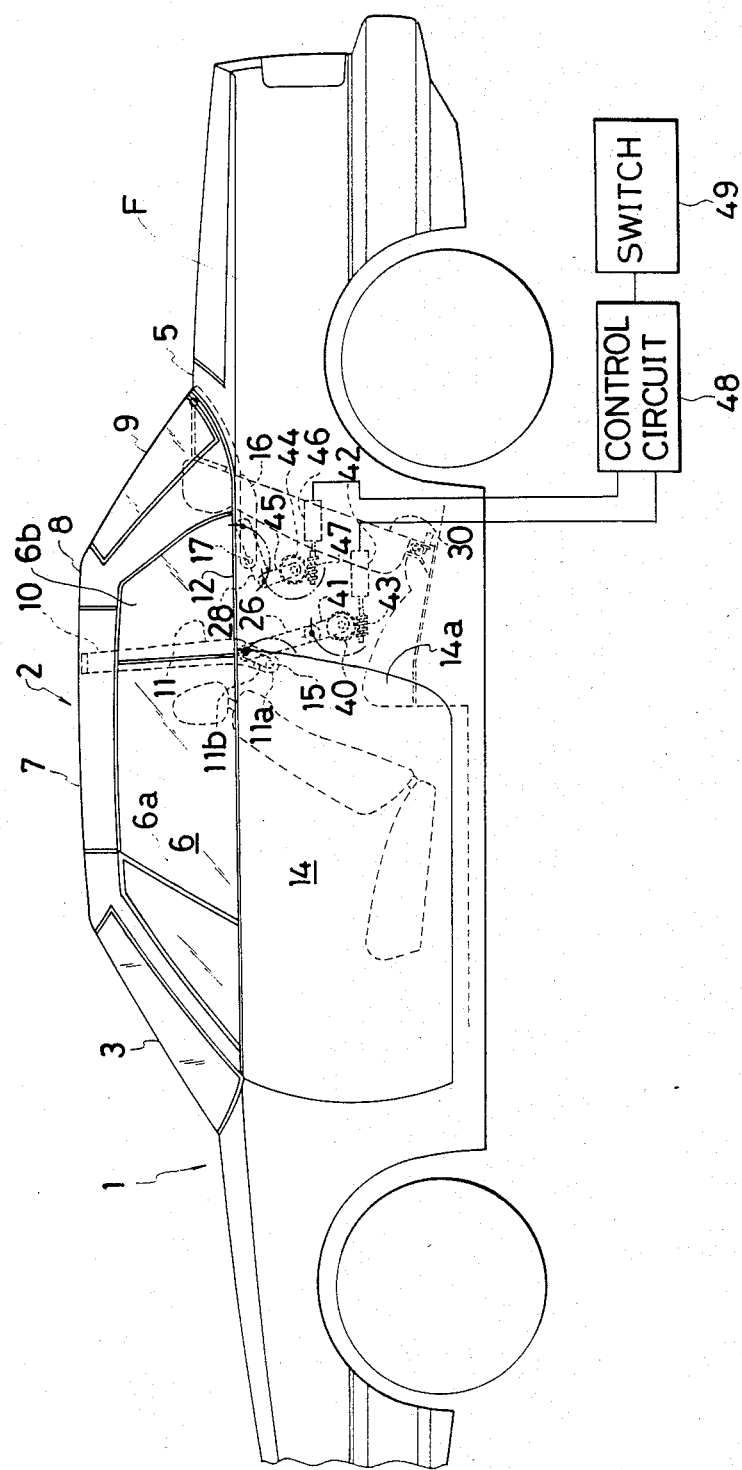
FIG. 16 is a side view of a vehicle in accordance with another embodiment of the present invention.
Figure 17:
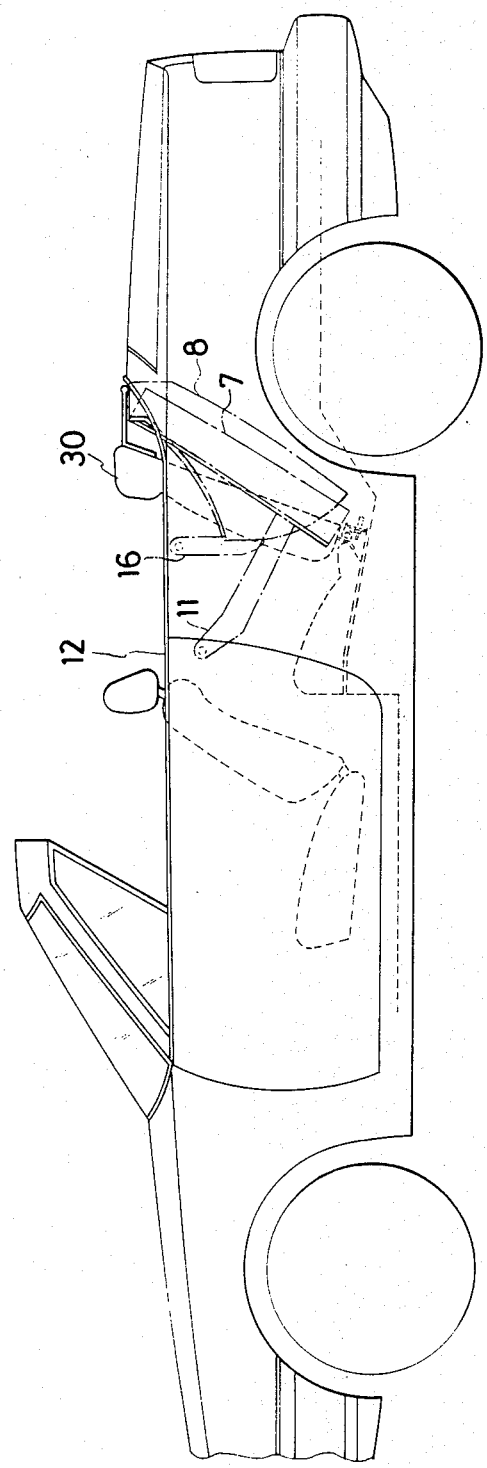
FIG. 17 is a side view of the vehicle shown in FIG. 16 in an open top condition.

Referring to FIG. 16, it will be noted that the vehicle body shown therein includes separate driving mechanisms respectively for the front and rear roof panels 7 and 8. More specifically, a first driving gear 40 is mounted on the inner panel of the rear fender assembly F and adapted to be driven by a first driving motor 42 through a worm mechanism 43. A first driving link 41 is secured to the driving gear 40 and has a free end pivotably connected with one end of an actuating link 26 which is pivotably connected at the other end with the leg portion 11 of the pillar structure 10 by means of an arm 11b as in the previous embodiment. A second driving gear 44 is also mounted on the rear fender panel assembly F and adapted to be driven by a second driving motor 46 through a worm mechanism 47. A first driving link 45 is secured to the gear 44 and has a free end pivotably connected with one end of a link 28 which is pivotably connected at the other end with an intermediate portion of the arm 16 on the rear roof panel 8.

Figure 18:
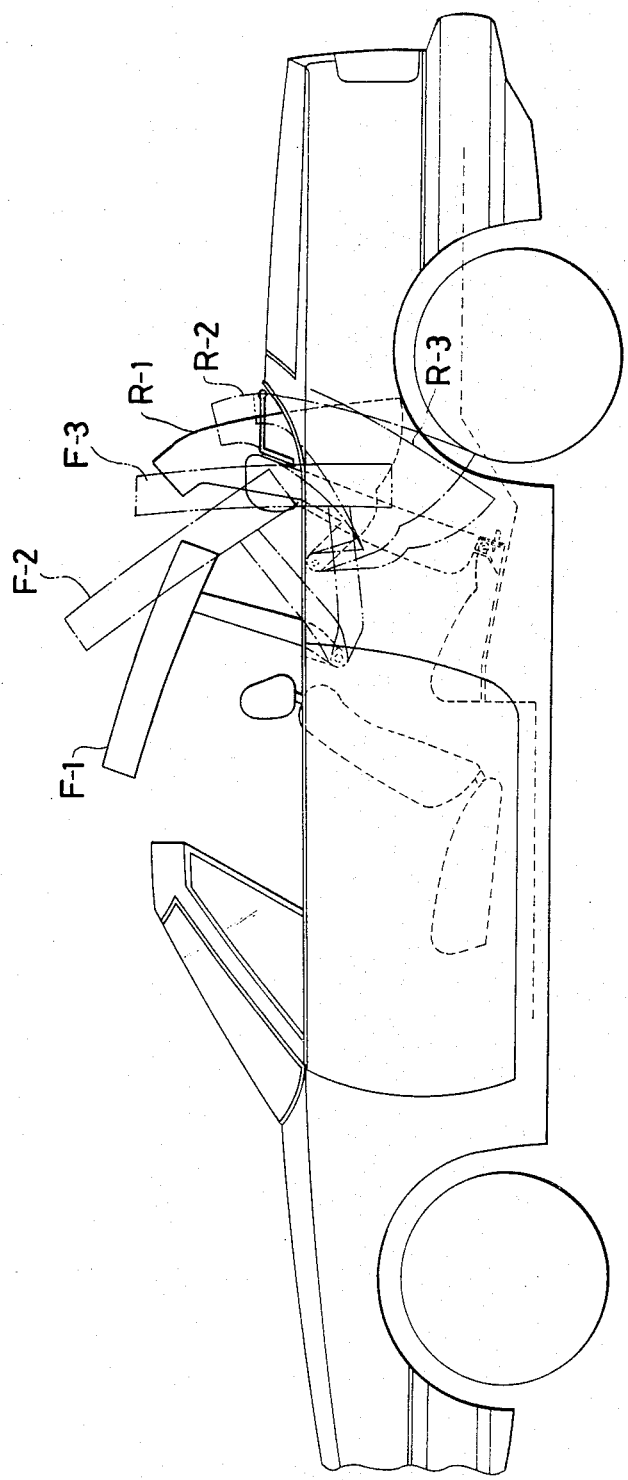
FIG. 18 is a side view showing the operation of the roof actuating mechanism.
Figure 19:
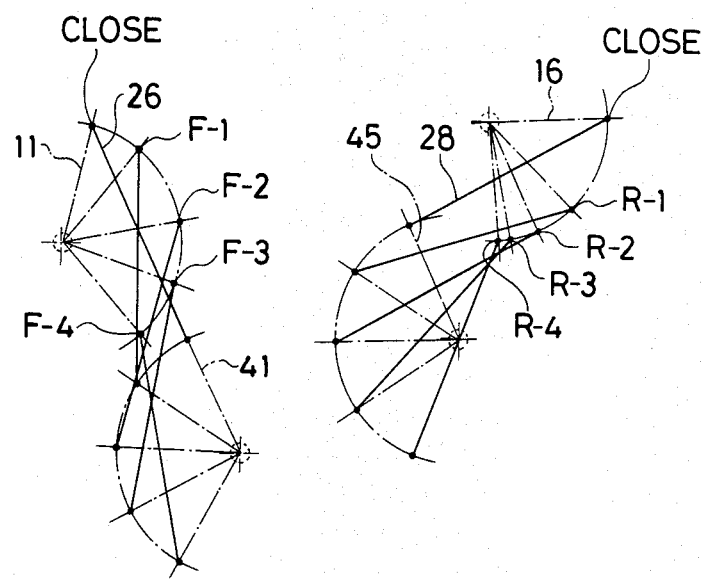
FIG. 19 is a diagram showing the operation of the link actuating linkage.

The motors 42 and 46 are connected with a control circuit 48 which is operated by an actuating switch 49 so that the motors 42 and 46 are operated in synchronism. FIG. 18 is a view corresponding to FIG. 3 and shows sequential positions of the roof panels 7 and 8 when they are moved from the erected positions to the retracted positions. FIG. 19 corresponding to FIG. 4 and shows operations of the roof panel actuating link mechanisms.

Figure 20:
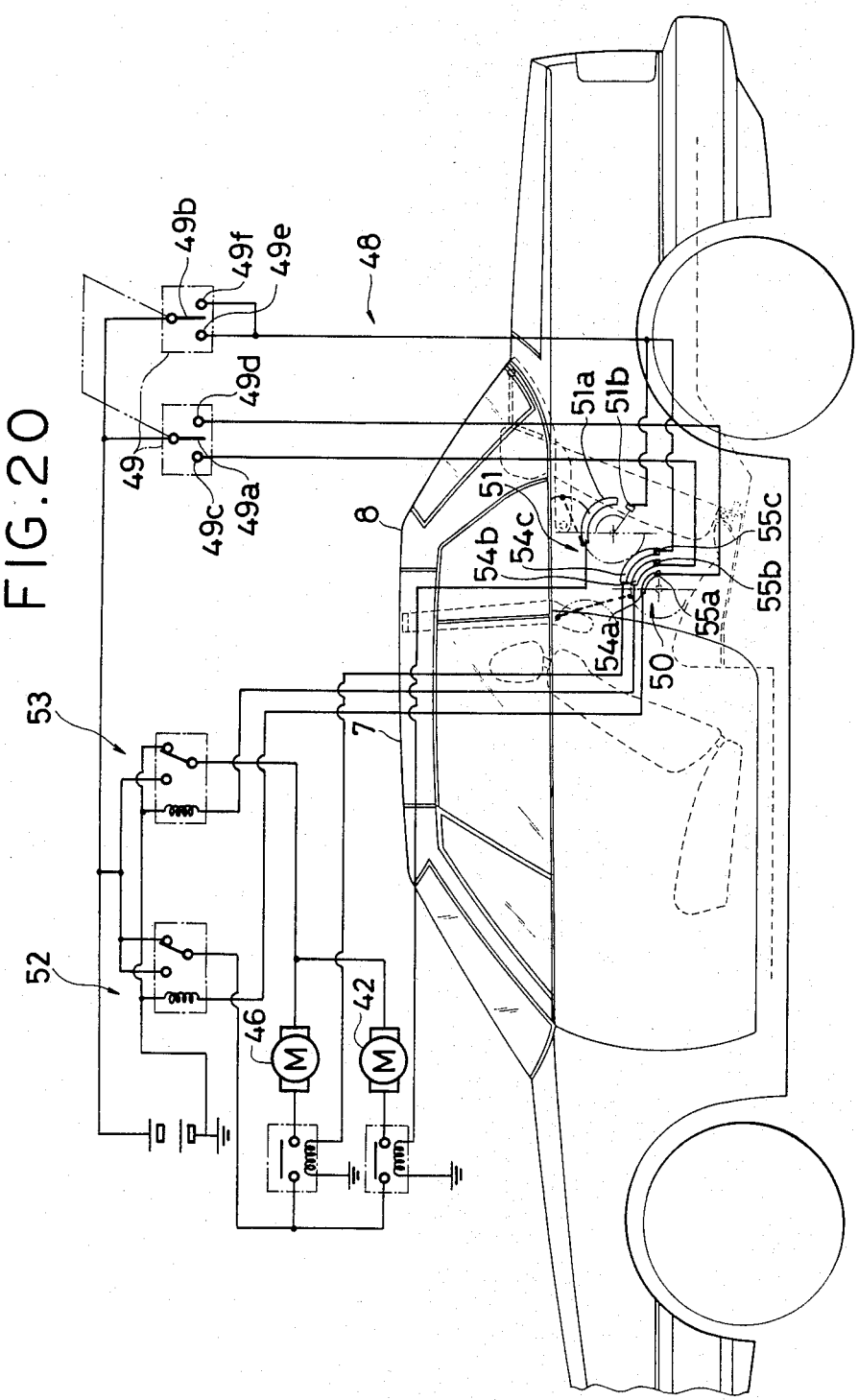
FIG. 20 is a side view of the vehicle with a circuit diagram of the roof panel actuating device.

In FIG. 20, there are shown details of the control circuit 48. The control circuit 48 includes first and second limit switches 50 and 51 which control the operating strokes of the motors 42 and 46 respectively and first and second relay switches 52 and 53 for controlling the directions of operations of the motors 42 and 46 respectively. The switch 50 includes arcuate stationary contacts 54a, 54b and 54c and movable contacts 55a, 55b and 55c which cooperate with the contacts 54a, 54b and 54c, respectively. The switch 51 includes an arcuate stationary contact 51a and a movable contact 51b which cooperates with the contact 51a. There are provided relay switches 52 and 53 which functions to govern the directions of rotation of the motors 42 and 46. The relay 52 is a roof close relay and has a relay solenoid connected with the stationary contact 54a. The relay 53 is a roof open relay and has a relay solenoid connected with the stationary contact 54b.

The manual switch 49 includes a pair of contact arms 49a and 49b. The contact arm 49a cooperates with a roof opening contact 49c and a roof closing contact 49d. The contact arm 49b is adapted to be actuated together with the contact arm 49a and cooperates with contacts 49e and 49f. The opening contact 49c is connected with the movable contact 55b whereas the closing contact 49d is connected with the movable contact 55a. The contacts 49e and 49f are both connected with the movable contacts 55c and 51b. The movable contacts 55a, 55b, 55c and 51b are moved in synchronism with the rotation of the motor 42. The movable contact 55a is located so that in the open position of the roof structure it is in contact with the stationary contact 54a and disconnected from the contact 54a in the close position of the roof structure. The movable contact 55b is located so that it is in contact with the stationary contact 54b in the close position of the roof structure and disconnected from the contact 54b in the open position of the roof structure. The movable contact 51b located so that it is disconnected from the stationary contact 51a in the close position of the roof structure, however, it is brought into contact with the stationary contact 51a when the motor 42 is rotated by a predetermined angle. The movable contact 55c is located so that it is disconnected from the stationary contact 54c in the open position of the roof structure, and brought into contact with the stationary contact when the motor 42 is rotated by a predetermined angle. The contact 54c is connected with the energizing coil of the motor 42 whereas the contact 51a is connected with the energizing coil of the motor 46.

It will be understood that when the switch 49 is actuated in the closed position of the roof structure to close the contact 49c, the roof open relay 53 is energized so that the motors 42 and 46 are forwardly biased and the motor 46 is at first energized to start to move the rear roof panel toward the opening direction. Then, after the predetermined angle of rotation of the motor 46, the motor 42 is energized to start to move the front roof panel toward the opening direction. In the open position, the relay 53 is deenergized so that the operations of the motors 42 and 46 are stopped. In closing the roof structure, the reverse operations are performed because the roof closing relay 52 is energized. It will be noted that, in this instance, the motor 42 is at first energized and the motor 46 is energized when the motor 42 is rotated by the predetermined angle.

Figure 21:
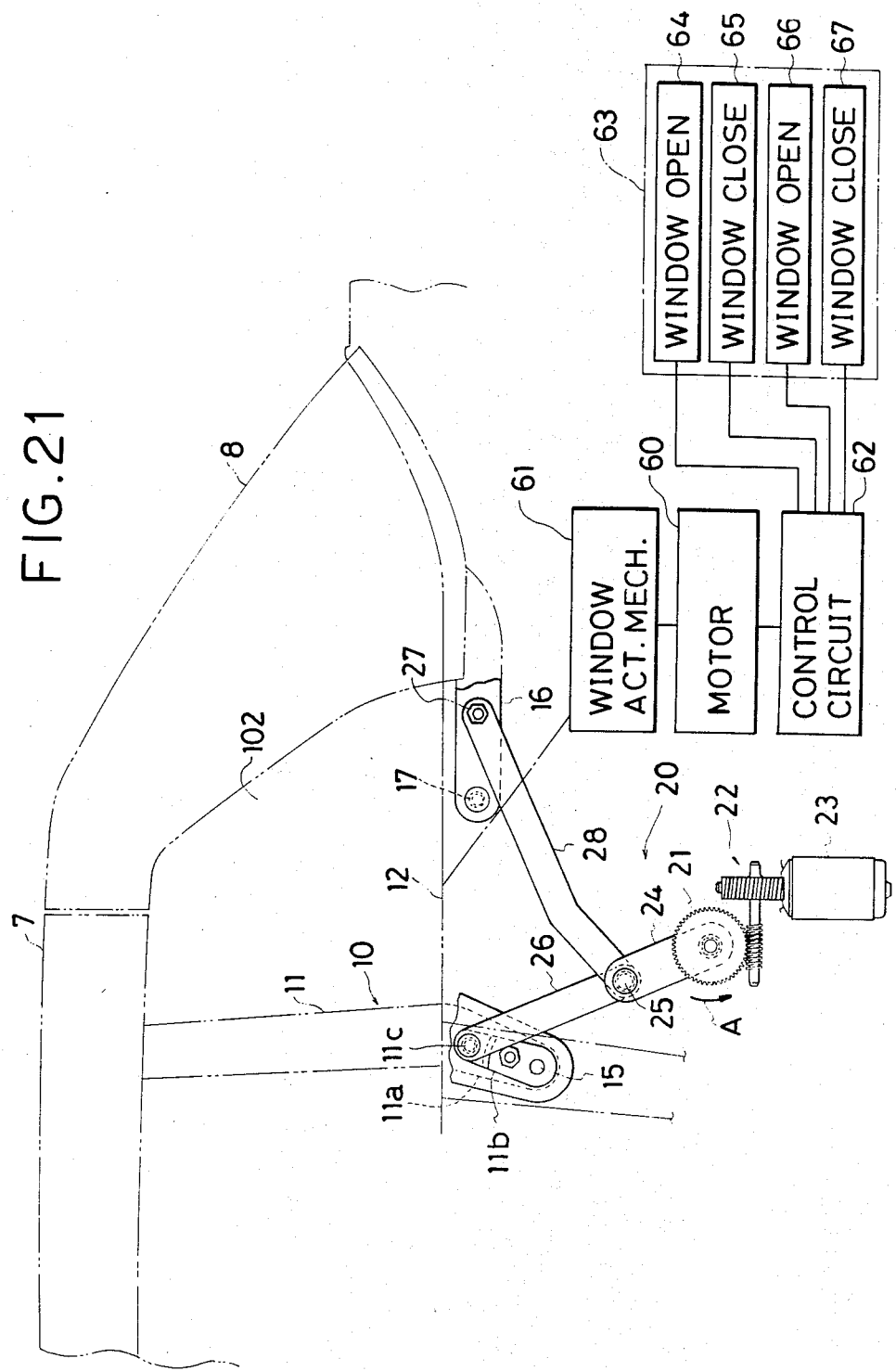
FIG. 21 is a fragmentary side view showing another embodiment of the present invention in which a rear quarter window actuating power system is provided; and, FIG. 22 is a circuit diagram for the rear quarter panel actuating power system.
Figure 22:
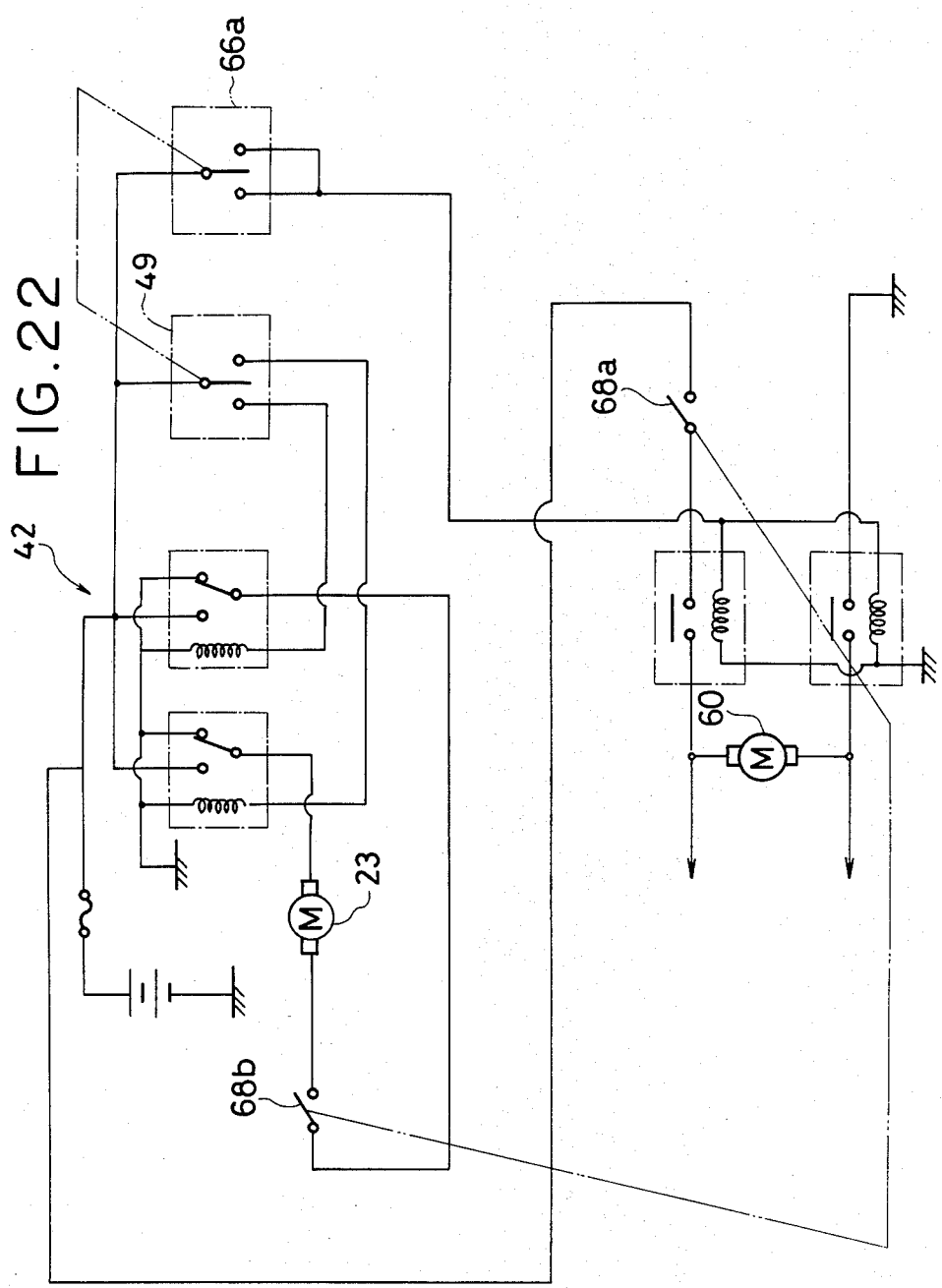

Referring now to FIG. 21, the embodiment shown therein is substantially identical to the embodiment shown in FIG. 1 except that a window actuating motor mechanism is provided. The motor mechanism includes an actuating motor 60 for driving a window driving mechanism 61 which may be of a conventional type for driving the rear quarter window panel 102. A control circuit 62 is provided for controlling the operation of the motor 60 under the operation of the window actuating switch device 63 including left and right window opening switches 64 and 66 and left and right window closing switches 65 and 67. In FIG. 22, it will be noted that in the closing circuit for the motor 60, there is provided a limit switch 68a which opens when the window 102 is fully opened. In the energizing circuit for the motor 23, there is provided a limit switch 68b which closes when the window 102 is fully opened. There is further provided a window operating switch 66a which is interconnected with the roof operating switch 49 so that the window motor 60 is at first energized to open the rear quarter window 102 when the roof operating switch 49 is actuated to retract the roof panels in a condition where the window 102 is closed. With this circuit, it becomes possible to ensure that the roof panels are driven to the open positions only when the rear quarter window 102 is fully opened.

The invention has thus been shown and described with reference to specific embodiments, however, it should be noted that the invention is in no way limited to the details of the illustrated structures but changes and modifications may be made without departing from the scope of the appended claims.

We claim:

1. A convertible vehicle body structure including body means having front windshield means and a rear body section, substantially rigid front roof panel means having a pair of leg means swingably mounted on said rear body section for swingable movements between an erected position wherein the front roof panel means is engaged at a front edge portion with an upper edge portion of the front windshield means for covering a front top portion of a passenger compartment in the body means and a retracted position wherein the front roof panel means is retracted in the rear body section of the body means, substantially rigid rear roof panel means pivotably mounted through pivot means on the rear body section of the body means for movements between an erected position wherein said rear roof panel means is engaged at a front edge portion with a rear edge portion of the front roof panel means in the erected position to cover a rear top portion of the passenger compartment and a retracted position wherein the rear roof panel means is retracted in the rear body section of the body means, said front and rear roof panel means being located respectively in a fore-and-aft relationship when both the front and rear roof panel means are retracted, first link means for driving said front roof panel means and second link means for driving said rear roof panel means, common motor means for actuating the first and second link means, said first and second link means being arranged so that the rear roof panel means is moved faster than the front roof panel means in an initial stage of an operation for moving the front and rear roof panel means from the erected position to the retracted position and the front roof panel means is moved faster than the rear roof panel means in an initial stage of an operation for moving the front and rear roof panel means from the retracted position to the erected position.

2. A convertible vehicle body structure in accordance with claim 1 in which said motor means is provided with a driving link connected with a first driven link in the first link means and a second driven link in the second link means, said first driven link being located with respect to the driving link when the front roof panel means is in the retracted position to make an angle which is larger than an angle between the second driven link and the driving link in the retracted position of the rear roof panel means so that the front roof panel means is moved relatively more rapidly than the rear roof panel means in the initial stage of the operation for moving the front and rear roof panels to the erected position.

3. A convertible vehicle body structure in accordance with claim 2 in which said first driven link is arranged with respect to the driving link when the front roof panel means is in the erected position to make an angle which is larger than an angle between the second driven link and the driving link in the erected position of the rear roof panel means so that the front roof panel means is moved relatively more slowly than the rear roof panel means in the initial stage of the operation for moving the front and rear roof panel means to the retracted position.

4. A convertible vehicle body structure in accordance with claim 1 in which said leg means of the front roof panel means are mounted to the rear body section at positions below a belt line of the rear body section.

5. A convertible vehicle body structure in accordance with claim 4 which includes motor means connected through link means with the leg means for driving the front roof panel means.

6. A convertible vehicle body structure in accordance with claim 5 in which said motor means has a driving link which is connected commonly with links for driving the front and rear roof panel means.

7. A convertible vehicle body structure in accordance with claim 1 in which said rear roof panel means is provided at the opposite side portions with arm means which are pivotably mounted on said rear body section through said pivot means.

8. A convertible vehicle body structure including body means having front windshield means and a rear body section, substantially rigid front roof panel means having a pair of leg means swingably mounted on said rear body section for swingable movements about a pivot axis between an erected position wherein the front roof panel means is engaged at a front edge portion with an upper edge portion of the front windshield means for covering a front top portion of a passenger compartment in the body means and a retracted position wherein the front roof panel means is retracted in the rear body section of the body means, substantially rigid rear roof panel means pivotably mounted through pivot means on the rear body section of the body means for movements between an erected position wherein said rear roof panel means is engaged at a front edge portion with a rear edge portion of the front roof panel means to cover a rear top portion of the passenger compartment and a retracted position wherein the rear roof panel means is retracted in the rear body section of the body means, said front and rear roof panel means being located, respectively, in a fore-and-aft relationship when both the front and rear roof panel means are retracted, first link means for driving said front roof panel means, second link means for driving said rear roof panel means, first and second motor means for actuating the first and second link means, respectively, said first link means having one end connected through a first driving link with said first motor means, the other end of said first link means being connected with said leg means of said front roof panel means at a position offset from said pivot axis, said second link means having one end connected through a second driving link with said second motor means, the other end of said second link means being connected with said rear roof panel means at a position offset from said pivot means, whereby the rear roof panel means is moved faster than the front roof panel means in an initial stage of an operation for moving the front and rear roof panel means from the erected position to the retracted position and the front roof panel means is moved faster than the rear roof panel means in an initial stage of an operation for moving the front and rear roof panel means from the retracted position to the erected position but the front and rear roof panel means are moved substantially simultaneously in the remaining period of the operation.

9. A convertible vehicle body structure in accordance with claim 8 in which said first motor means is provided with a first driving link connected with a first driven link in the first link means and the second motor means is provided with a second driving link connected with a second driven link in the second link means, said first driven link being located with respect to the first driving link when the front roof panel means is in the retracted position to make an angle which is larger than an angle between the second driven link and the second driving link so that the front roof panel means is moved relatively more rapidly than the roof panel means in the initial stage of the operation for moving the front and rear roof panels to the erected position.

10. A convertible vehicle body structure in accordance with claim 9 in which said first driven link is arranged with respect to the first driving link when the front roof panel means is in the erected position to make an angle which is larger than an angle between the second driven link and the second driving link in the erected position of the rear roof panel means so that the front roof panel means is moved relatively more slowly than the rear roof panel means in the initial stage of the operation for moving the front and rear roof panel means to the retracted position.

11. A convertible vehicle body structure including body means having front windshield means and a rear body section, substantially rigid front roof panel means having a pair of leg means swingably mounted on said rear body section for swingable movements between an erected position wherein the front roof panel means is engaged at a front edge portion with an upper edge portion of the front windshield means for covering a front top portion of a passenger compartment in the body means and a retracted position wherein the front roof panel means is retracted in the rear body section of the body means, substantially rigid rear roof panel means pivotably mounted through pivot means on the rear body section of the body means for movements between an erected position wherein said rear roof panel means is engaged at a front edge portion thereof with a rear edge portion of the front roof panel means to cover a rear top portion of the passenger compartment and a retracted position wherein the rear roof panel means is retracted in the rear body section of the body means, said front and rear roof panel means being located, respectively, in a fore-and-aft relationship when both the front and rear roof panel means are retracted, link means for driving said front and rear roof panel means, motor means for actuating the first and second link means, said link means being arranged so that the front and rear roof panel means are moved simultaneously at least in a part of a period of an operation for moving the front and rear roof panel means between the erected position and the retracted position.

12. A convertible vehicle body structure in accordance with claim 11 in which first means is provided for starting to move the rear roof panel means faster than the front roof panel means when the front and rear roof panel means are moved from the erected positions to the retracted positions.

13. A convertible vehicle body structure in accordance with claim 12 in which second means is provided for starting to move the front roof panel means faster than the rear roof panel means when the front and rear roof panel means are moved from the retracted position to the erected position.

14. A convertible vehicle body structure in accordance with claim 11 in which said pair of leg means are formed as parts of a substantially U-shaped pillar structure which is secured to said front roof panel means.

15. A convertible vehicle body structure in accordance with claim 11 in which said first and second roof panel means are arranged so that the rear roof panel means is moved faster than the front roof panel means in an initial stage of an operation for moving the front and rear roof panel means from the erected position to the retracted position and the front roof panel means is moved faster than the rear roof panel means in an initial stage of an operation for moving the front and rear roof panel means from the retracted position to the erected position.

16. A convertible vehicle body structure including body means having front windshield means and a rear body section, substantially rigid front roof panel means having a pair of leg means swingably mounted on said rear body section for swingable movements between an erected position wherein the front roof panel means is engaged at a front edge portion with an upper edge portion of the front windshield means for covering a front top portion of a passenger compartment in the body means and a retracted position wherein the front roof panel means is retracted in the rear body section of the body means, substantially rigid rear roof panel means having a pair of arm means pivotably mounted on the rear body section of the body means for movements between an erected position wherein said rear roof panel means is engaged at a front edge portion with a rear edge portion of the front roof panel means to cover a rear top portion of the passenger compartment and a retracted position wherein the rear roof panel means is retracted in the rear body section of the body means, said front and rear roof panel means being located, respectively, in a fore-and-aft relationship when both the front and rear panel means are retracted, link means for driving said front and rear roof panel means, common motor means for actuating both the first and second link means.

17. A convertible vehicle body structure in accordance with claim 16 in which said link means is arranged so that the rear roof panel means is moved faster than the front roof panel means in an initial stage of an operation for moving the front and rear roof panel means from the erected position to the retracted position and the front roof panel means is moved faster than the rear roof panel means in an initial stage of an operation for moving the front and rear roof panel means from the retracted position to the erected position.

18. A convertible vehicle body structure including body means having front windshield means and a rear body section, substantially rigid front roof panel means having a pair of leg means swingably mounted on said rear body section for swingable movements between an erected position wherein the front roof panel means is engaged at a front edge portion with an upper edge portion of the front windshield means for covering a front top portion of a passenger compartment in the body means and a retracted position wherein the front roof panel means is retracted in the rear body section of the body means, substantially rigid rear roof panel means pivotably mounted through pivot means on the rear body section of the body means for movements between an erected position wherein said rear roof panel means is engaged at a front edge portion with a rear edge portion of the front roof panel means to cover a rear top portion of the passenger compartment and a retracted position wherein the rear roof panel means is retracted in the rear body section of the body means, said front and rear roof panel means being located, respectively, in a fore-and-aft relationship when both the front and rear roof panel means are retracted, said leg means of the front roof panel means being mounted to the rear body section at positions below a belt line of the rear body section, motor means connected through link means with the leg means for driving the front roof panel means, said motor means having a driving link which is connected commonly with links for driving the front and rear roof panel means.

19. A convertible vehicle body structure in accordance with claim 18 in which said rear body section is provided at each side with a rear quarter window panel which is movable between an open position and a retracted position, window actuating motor means for actuating said window panel, control means for operating the window actuating motor means to start the window panel moving to the open position before the front and rear roof panel means are started moving to the retracted positions where the rear quarter window panel is in the closed position.

20. A convertible vehicle body structure in accordance with claim 19 in which said control means includes window switch means and roof switch means which are interconnected together and limit switch means which closes a circuit for energizing the roof actuating motor means to the retracted position only when the rear quarter panel is in the open position.

21. A convertible vehicle body structure in accordance with claim 19 in which said arm means of said rear roof panel means extends forwardly at portions below a belt line of the rear body section and is connected at front ends to the rear body section.

* * * * *